(12) United States Patent
Koike

(10) Patent No.: US 6,243,578 B1
(45) Date of Patent: *Jun. 5, 2001

(54) TRANSMITTING/RECEIVING UNIT FOR USE WITH A MOBILE COMMUNICATION DEVICE

(76) Inventor: Kunihiko Koike, Setagaya-ku, Tokyo 154 (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/994,968

(22) Filed: Dec. 19, 1997

(30) Foreign Application Priority Data

Jun. 24, 1997 (JP) .................................................. 9-166916

(51) Int. Cl.$^7$ ....................................................... H04B 1/38
(52) U.S. Cl. ........................... 455/426; 455/414; 455/556; 455/557
(58) Field of Search ..................................... 455/424, 412, 455/413, 414, 556, 558; 379/93.24, 424

(56) References Cited

U.S. PATENT DOCUMENTS

| | | | |
|---|---|---|---|
| 4,996,704 | * 2/1991 | Brunson | 379/67 |
| 5,436,969 | * 7/1995 | Kobayashi | 379/434 |
| 5,465,401 | * 11/1995 | Thompson | 455/558 |
| 5,479,411 | * 12/1995 | Klein | 370/110.1 |
| 5,594,952 | * 1/1997 | Virtuoso et al. | 455/89 |
| 5,606,594 | * 2/1997 | Register et al. | 379/434 |
| 5,659,890 | * 8/1997 | Hikada | 455/558 |
| 5,687,194 | * 11/1997 | Paneth et al. | 375/283 |
| 5,742,668 | * 4/1998 | Pepe et al. | 379/58 |
| 5,875,404 | * 2/1999 | Messiet | 455/558 |
| 5,889,845 | * 3/1999 | Staples et al. | 379/211 |
| 5,915,226 | * 6/1999 | Martineau | 455/558 |

FOREIGN PATENT DOCUMENTS

| | | |
|---|---|---|
| 8-9006 | 1/1996 | (JP) . |
| 8-70272 | 3/1996 | (JP) . |
| 9-149109 | 6/1997 | (JP) . |

* cited by examiner

*Primary Examiner*—Daniel S. Hunter
*Assistant Examiner*—Thuan T. Nguyen
(74) *Attorney, Agent, or Firm*—Dickstein Shapiro Morin & Oshinsky LLP

(57) ABSTRACT

A telephone transmitting/receiving unit comprising an electronic circuit having a function of converting a signal received by an antenna to signal to be outputted by a speaker, a function of converting a signal inputted by a microphone to a signal to be outputted by the antenna, a function of performing prescribed processing, based on a signal from an operational unit, a function of generating a signal to a display unit, a cartridge removably loaded in a slot formed in the mobile communication terminal, and an input/output unit for inputting/outputting a signal to/from the mobile communication terminal is loaded in the mobile communication terminal. The telephone transmitting/receiving unit is loaded in the mobile communication terminal, whereby mobile communication can be performed by the use of the mobile communication terminal. The telephone transmitting/receiving unit is applicable to various types of mobile communication terminals, so that comfortable mobile communication can be provided corresponding to a time, place and occasion without contracting a plurality of circuits but by contracting one circuit.

9 Claims, 8 Drawing Sheets

FIG. 7
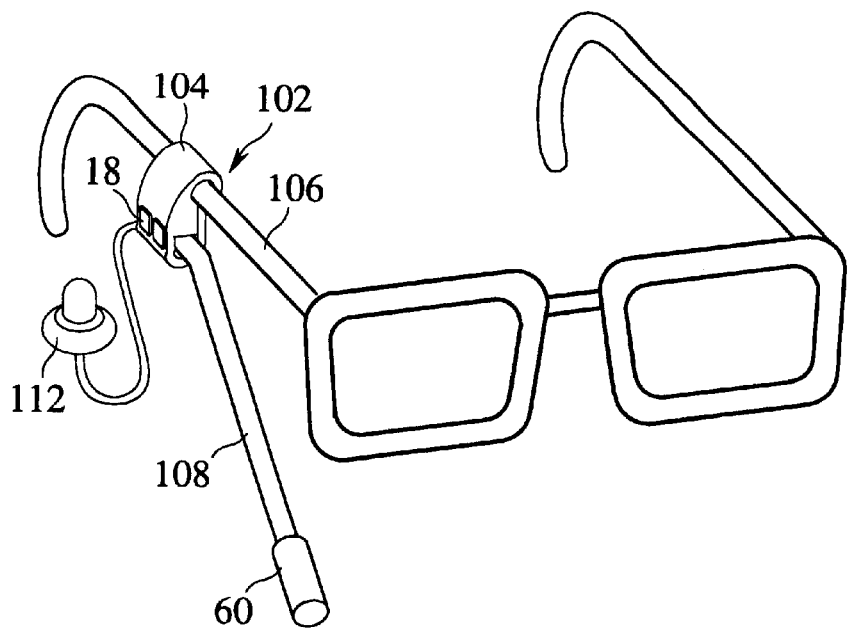
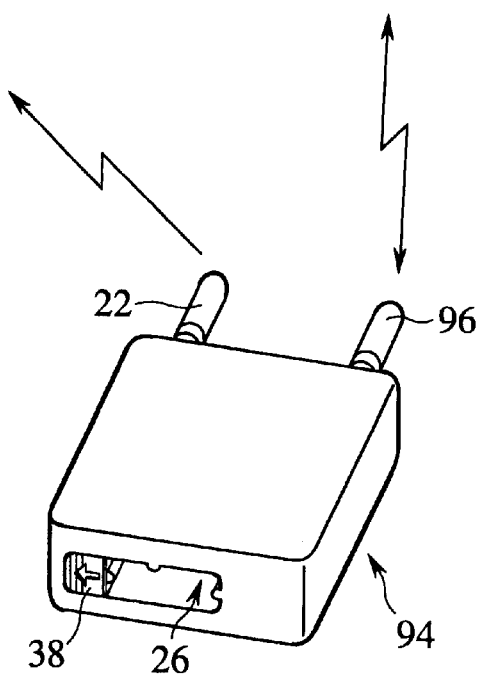
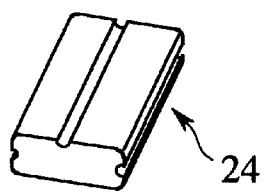

TRANSMITTING/RECEIVING UNIT FOR USE WITH A MOBILE COMMUNICATION DEVICE

BACKGROUND OF THE INVENTION

The present invention relates to a telephone transmitting and receiving unit, a mobile communication relay terminal and a mobile communication terminal which can realize comfortable mobile object communication suitable to a time, place and occasion without contracting a plurality of circuits. The present invention also relates to a communication service system in which contents of a received electronic mail without the use of a communication terminal which does not include a function of displaying data of the electronic mail in letters.

Recently, as prices of machine and instruments for mobile communication, and its service fees have been reduced, subscribers to the mobile communication has been increased. Increase of subscribers to the portable telephone, PHS (Personal Handy phone System), etc. is remarkable. As mobile computers, etc. prevail, applications of connecting portable telephone terminals, PHS terminals to the mobile computers for data communication are increasing. It is considered that the number of subscribers to the mobile communication will increase.

Recently PHS-integrated terminals including PHS terminals and PDAs (Personal Digital Assistants) integrated with each other are marketed, and a single terminal can accommodate services of telephone communication, electronic mail, etc.

However, the mobile communication uses electric waves of an allocated frequency band. In an allocated frequency band only a set number of circuits can be provided. Accordingly, if subscribers continue to increase as have done, a problem that the subscribers will exceed a circuit providing capacity limit will take place.

While the PHS-integrated terminal can realize various functions, the PHS-integrated terminal is large-sized a little inconveniently to carry in comparison with the PHS terminal and the portable telephone terminal, and some users contract different circuits for the PHS terminal and the portable telephone terminal to use the PHS-integrated terminal and PHS terminal suitably for purposes. To comfortably use the mobile communication suitably for TPO (Time, Place, Occasion) circuit service fees must be paid for the respective circuits, which much burdens the users. This is also a problem.

In the conventional communication service, by the PHS terminal, the portable telephone terminals, etc. having no function of displaying data of an electronic mail in letters the users cannot know contents of a received electronic mail.

SUMMARY OF THE INVENTION

An object of the present invention is to provide a telephone transmitting/receiving unit and a mobile communication terminal which can realize comfortable mobile communication corresponding to a time, place and occasion without contracting a plurality of circuits.

Another object of the present invention is to provide a telephone transmitting/receiving unit, a mobile communication relay terminal and a mobile communication terminal which can realize comfortable mobile communication corresponding to a time, place and occasion without contracting a plurality of circuits.

Further another object is to provide a communication service system in which even by the use of a communication terminal having no function of displaying data of an electronic mail in letters a user can know contents of a received electronic mail.

The above-described objects are achieved by a telephone transmitting/receiving unit comprising: an electronic circuit having a function of converting a received signal received by an antenna to a voice signal to be outputted by a speaker, a function of converting a voice signal inputted to a microphone to a transmitted signal to be outputted by the antenna, a function of conducting prescribed processing, based on an operational signal from an operational unit, and a function of generating a display signal to be displayed in a display unit; a cartridge including the electronic circuit and removably loaded in a slot formed in a mobile communication terminal; and an input/output unit included in the cartridge for inputting/outputting a signal to/from the mobile communication terminal. The telephone transmitting/receiving unit is loaded in the mobile communication terminal, whereby mobile communication can be performed by the use of the mobile communication terminal. The telephone transmitting/receiving unit is applicable to various types of mobile communication terminals, so that comfortable mobile communication can be provided corresponding to a time, place and occasion without contracting a plurality of circuits but by contracting one circuit.

The above-described objects are achieved by a mobile communication terminal comprising: an antenna for transmitting/inputting a signal to/from a base station; a speaker for outputting a voice signal; a microphone for inputting a voice signal; an operational unit for generating an operational signal, based on an operation; a display unit for display based on a display signal; a slot for receiving the above-described telephone transmitting/receiving unit; and an input/output unit included in the slot for inputting/outputting a signal to/from the telephone transmitting/receiving unit. The telephone transmitting/receiving unit is loaded in the mobile communication terminal, whereby mobile communication can be performed by the use of the mobile communication terminal. The telephone transmitting/receiving unit is applicable to various types of mobile communication terminals, so that comfortable mobile communication can be provided corresponding to a time, place and occasion without contracting a plurality of circuits but by contracting one circuit. The above-described mobile communication terminal does not have to include the electronic circuit formed in the telephone transmitting/receiving unit, which contributes to lower costs of the mobile communication terminal.

The above-described object is achieved by a mobile communication relay terminal comprising: an antenna for transmitting/receiving a signal to/from a base station; a slot for receiving the above-described telephone transmitting/receiving unit; an input/output unit disposed in the slot for inputting/outputting a signal to/from the telephone transmitting/receiving unit; and a unit for transmitting/receiving a signal to/from a mobile communication terminal. The mobile communication relay terminal includes the slot for receiving the telephone transmitting/receiving unit, whereby transmitted/received signals are relayed by the mobile communication relay terminal to perform mobile communication by the use of the mobile communication terminal. The mobile communication terminal can be smaller-sized, which provides comfortable mobile communication corresponding to a time, place and occasion.

The above-described object is achieved by a mobile communication terminal comprising: a microphone for inputting a voice signal; a speaker for outputting a voice signal; and a unit for transmitting/inputting a signal to/from the above-described mobile communication relay terminal. The mobile communication relay terminal includes the slot for receiving the telephone transmitting/receiving unit, whereby transmitted/received signals are relayed by the mobile communication relay terminal to perform mobile communication by the use of the mobile communication terminal. The mobile communication terminal can be smaller-sized, which provides comfortable mobile communication corresponding to a time, place and occasion.

In the above-described mobile communication terminal it is preferable that the mobile communication terminal is a portable telephone, a personal handy phone, a personal digital assistant or a mobile computer.

In the above-described mobile communication terminal it is preferable that the mobile communication terminal is in the form of a fountain pen, a key holder, a lighter or a pendant.

The above-described object is achieved by a communication service system for, when data transmitted by a transmitting person is electronic mail data, converting the electronic mail data to a voice signal, and transmitting the voice signal to a communication terminal. Electronic mail data is converted to voices for transmission, whereby even by the use of a communication terminal having no function of displaying electronic mail data in letters, a communication service system which enables contents of the electronic mail to be known can be provided.

In the above-described communication service it is preferable that for further storing the voice signal temporarily in set memory unit, and transmitting the voice signal to the communication terminal in response to a command of the communication terminal.

BRIEF DESCRIPTION OF THE DRAWINGS

FIG. 7 is a perspective view of the telephone transmitting/receiving unit, the mobile communication relay terminal and the mobile communication terminal according to a fifth embodiment of the present invention.

DETAILED DESCRIPTION OF THE INVENTION

A First Embodiment

Figure 1:
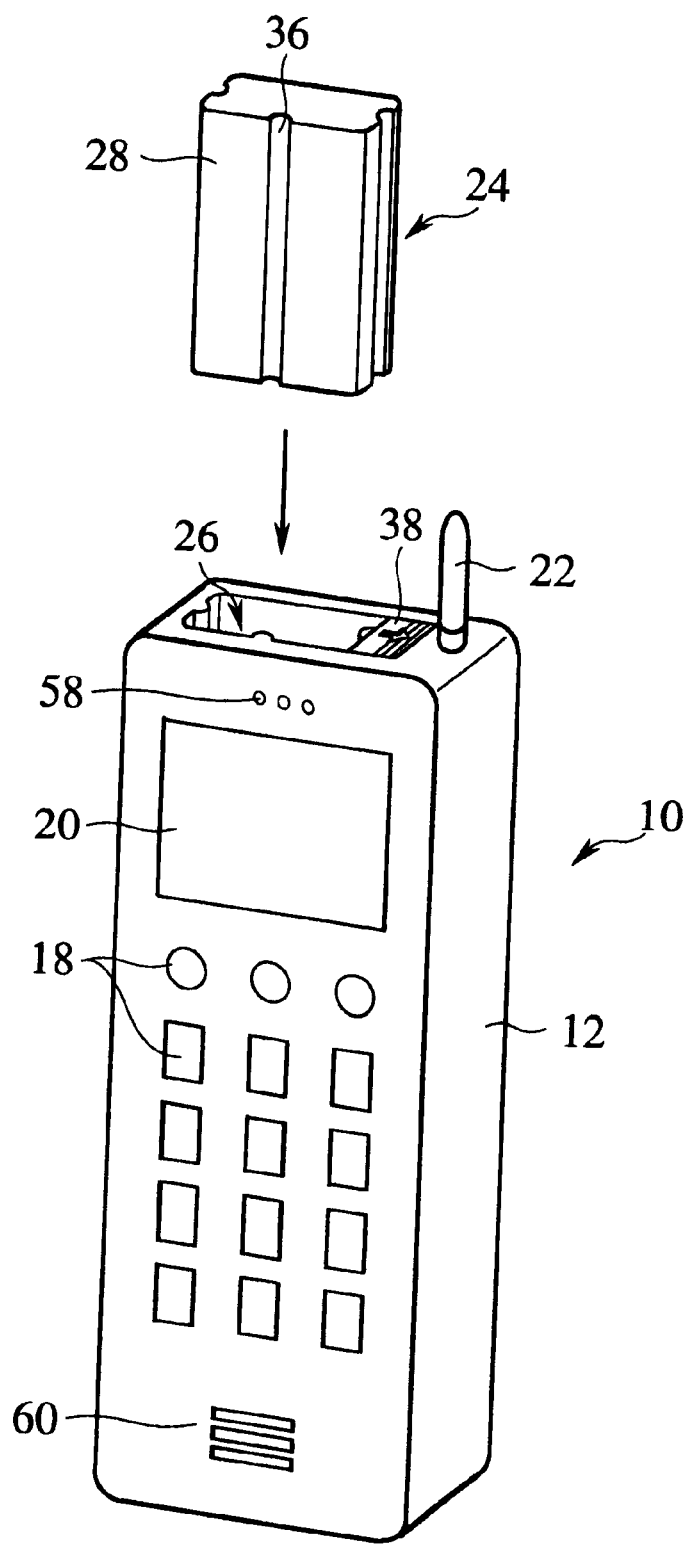
FIG. 1 is a perspective view of the telephone transmitting/receiving unit and the mobile communication terminal according to a first embodiment of the present invention.
Figure 2:
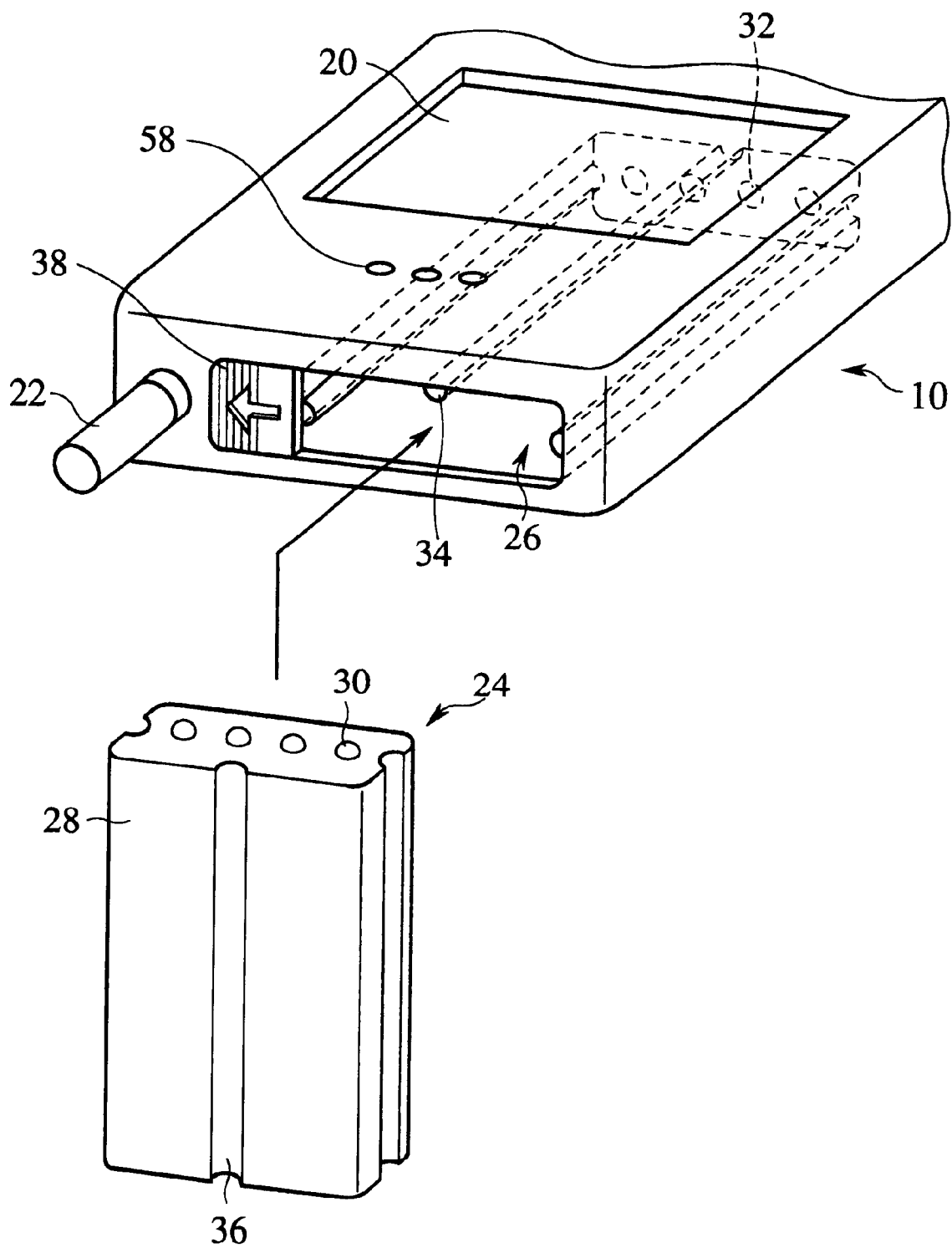
FIG. 2 is a detailed perspective view of the telephone transmitting/receiving unit and the mobile communication terminal according to the first embodiment of the present invention.
Figure 3:
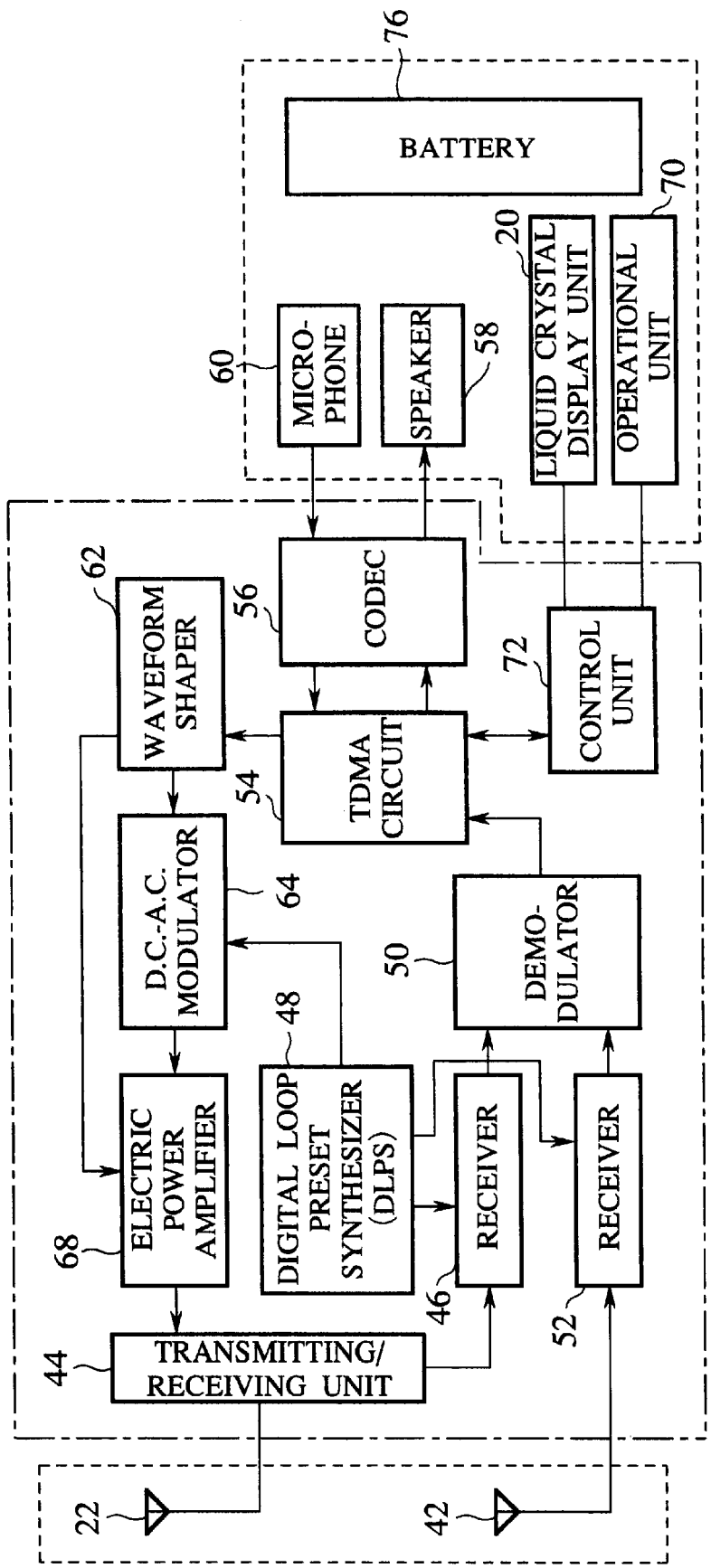
FIG. 3 is a block diagram of a circuit of the telephone transmitting/receiving unit and the mobile object communication terminal.

The telephone transmitting/receiving unit and the mobile object communication terminal according to a first embodiment of the present invention will be explained with reference to FIGS. 1 to 3. FIG. 1 is a perspective view of the telephone transmitting/receiving unit and the mobile communication terminal according to the present embodiment. FIG. 2 is a detailed perspective view of the telephone transmitting/receiving unit and the mobile communication terminal. FIG. 3 is a block diagram of a circuit of the telephone transmitting/receiving unit and the mobile communication terminal according to the present embodiment.

As shown in FIG. 1, on one side of a body 12 of a PHS terminal 10 there are provided a speaker 58 and a microphone 60 which are brought near respectively an ear and the mouth of a user in use.

Operational buttons 18 by which telephone numbers and required operations are inputted, and a liquid crystal display unit 20 for displaying an inputted telephone number, an operational state, etc. are provided also on the side of the body 12.

In the upper surface of the body 12 there is provided a transmitting/receiving antenna 22 for transmitting and receiving signals to/from base stations, and a slot 26 for removably receiving a telephone transmitting/receiving unit 24 is formed in also in the upper surface of the body 12.

FIG. 2 details the telephone transmitting/receiving unit 24 and the slot 26.

A cartridge 28 of the telephone transmitting/receiving unit 24 accommodates an electronic circuit (see FIG. 3). On the cartridge 28 there are formed input/output terminals 30 for supplying electric power from the PHS terminal 10 to the electronic circuit and inputting/outputting signals to/from the PHS terminal 10. The input/output terminals 30 are formed so that when the telephone transmitting/receiving unit 24 is inserted in the slot 26, they are connected to input/output terminals 32 formed in the slot 26. A groove 36 is formed in the cartridge 28 so as to receive a guide rail 34 formed in the slot 26. The guide rail 34 and the groove 36, which are formed so that the former is received in the latter, can prevent erroneous insertion of the telephone transmitting/receiving unit 24.

A lock mechanism constituted by a slide button 38 and a spring (not shown) is provided near an insertion opening of the slot 26. FIG. 2 shows the slide button 38 slid in the direction of the arrow. When the slide button 38 is slid in the direction of the arrow, the slide button 38 is returned by the spring in the direction opposite to the direction of the arrow. When the telephone transmitting/receiving unit 24 is inserted into the slot 26, as shown in FIG. 2, the slide button 38 is slid in the direction of the arrow to open the insertion opening, and the telephone transmitting/receiving unit 24 is inserted. Then, a force which has urged the slide button 38 in the direction of the arrow is weakened, the slide button 38 is returned by the spring back to the usual position. The inserted telephone transmitting/receiving unit 24 is secured by the slide button 38.

Next, with reference to FIG. 3, a circuit of the telephone transmitting/receiving unit 24 and the PHS terminal 10 will be explained.

The telephone transmitting/receiving unit 24 and the PHS terminal 10 according to the present embodiment is applicable to the digital communication of PDC (Personal Digital Cellular system), which is commonly used in Japan.

In FIG. 3, the constituent members in the one-dot-chain line are included in the telephone transmitting/receiving unit 24, and the constituent members in the dot line are included in the PHS terminal 10.

The constituent members in the one-dot-chain line are universally used in various types of mobile communication terminals and are included in their telephone transmitting/receiving unit 24. The constituent members in the dot line are those, such as the transmitting/receiving antenna 22 and the receiving antenna 42, that cannot have good characteristics when they are included in the telephone transmitting/receiving unit 24, and those, the liquid crystal display unit 20, the speaker 58, the microphone 60, an operational unit 70 and a battery 76, that have different specifications among various types of mobile communication terminals and are included in the PHS terminal 10.

The PHS terminal 10 accommodates in the body 12 the receiving antenna 42 exclusively for receiving in addition to the transmitting/receiving antenna 22. The two systems of the receiving antennas are thus provided so that the receiving antennas are suitably changed over therebetween to decrease receiving state changes, and this method is called diversity receiving method. The diversity receiving method very effectively can stably receive signals from base stations even in multipass phasing due to interferences among electric waves of different passes.

A receiving signal received by the transmitting/receiving antenna 22 is inputted to a receiver 46 via transmitting/receiving unit 44. A signal of a prescribed frequency is inputted to the receiver 46 from a digital loop preset synthesizer 48. The receiver 46 conducts prescribed signal processing on the received signal inputted by the transmitting/receiving unit 44 by the use of the signal of the prescribed frequency inputted by the digital loop preset synthesizer 48 and outputs the signal to a demodulator 50. The transmission/receiving from/to base stations uses TDMA (Time Division Multiple Access) method. TDMA method uses an allocated time to each frame by dividing the same. In TDMA method the mobile communication terminal uses a vacant time slot between intermittently transmitted or received burst signals to instantaneously measure a receiving electric field intensity between neighboring base stations to find base stations which can be communicated in good state, so that the digital loop preset synthesizer 48, which can instantaneously complete change-over of a channel, is used.

A receiving signal received by the receiving antenna 42 is inputted to a receiver 52. A signal of a prescribed frequency is inputted to the receiver 52 by the digital loop preset synthesizer 48. The receiver 52 conducts prescribed signal processing on the received signal inputted by the receiving antenna 42 by the use of the signal of the prescribed frequency inputted by the digital loop preset synthesizer 48 and outputs the signal to a demodulator 50.

The demodulator 50 modulates selectively the signal inputted by the receiver 46 and the signal inputted by the receiver 52, and outputs the selected signal to a TDMA circuit 54. The TDMA circuit 54 has functions of multiplexing signals, separating signals, correction, confidential processing, etc.

The TDMA circuit 54 conducts prescribed processing on the signal inputted by the demodulator 50 and outputs the signal to a CODEC (COder-DECoder) 56. The CODEC 56 converts the digital signal inputted by the TDMA circuit 54 to an analog speech signal and outputs the signal to the speaker 58. The speaker 58 outputs the inputted speech signal as a speech. The speech outputted by the speaker 58 is transmitted to an ear of the user.

On the other hand, a speech uttered from the mouth of the user is converted to a speech signal by the microphone 60 and inputted to the CODEC 56. The CODEC 56 converts the speech signal inputted by the microphone 60 to a digital signal and outputs the signal to the TDMA circuit 54.

The signal inputted to the TDMA circuit 54 by the CODEC 56 is subjected to the prescribed processing by the TDMA circuit 54 and outputted to a waveform shaper 62. The signal inputted to the waveform shaper 62 is shaped and outputted to a D.C.-A.C. modulator 64. The D.C.-A.C. modulator 64 modulates the signal inputted by the waveform shaper 62 by $\pi/4$ shift QPSK (Quarternary Phase-Shift Keying) modulation method by the use of the signal of the prescribed frequency inputted by the digital loop preset synthesizer 48. The use of $\pi/4$ shift QPSK modulation method can improve transmission efficiency.

The signal modulated by the D.C.-A.C. modulator 64 is outputted to an electric power amplifier 68. The electric power amplifier 68 has high linear amplification achievement and can well amplify the $\pi/4$ QPSK modulated wave.

The amplified signal by the electric power amplifier 68 is transmitted to a base station from the transmitting/receiving antenna 22 via the transmitting/receiving unit 44.

Turn on/off of the electric power, operation of inputting a telephone number are performed by the operational buttons 18 provided as the operational unit 70. When an operational signal is inputted to a control unit 72, the control unit 72 controls the electronic circuit, based on the inputted operational signal.

Display signals indicative of an operational state, and telephone numbers, etc. inputted by the operational unit 70 are outputted to the liquid crystal display unit 20 by the control unit 72.

Electric power is supplied from a battery 76 accommodated in the body 12 to the electronic circuit.

As described above, according to the present embodiment, the electric circuit having the above-described function is accommodated in the cartridge which can be removably loaded in the slot which is common with mobile communication terminals, such as PHS terminals, etc., whereby when a PHS terminal is used for a mobile communication, the mobile communication can be performed by loading the telephone transmitting/receiving unit in a cartridge of the PHS terminal. The telephone transmitting/receiving unit can be loaded in various mobile communication terminals, so that comfortable mobile communication can be provided corresponding to a time, place and occasion without contracting a plurality of circuits but with contracting a single circuit.

In the above-described mobile communication terminal it is not necessary to form the electronic circuit formed in the telephone transmitting/receiving unit in the mobile communication terminal, which can contribute to low costs of the mobile communication terminal.

A Second Embodiment

Figure 4:
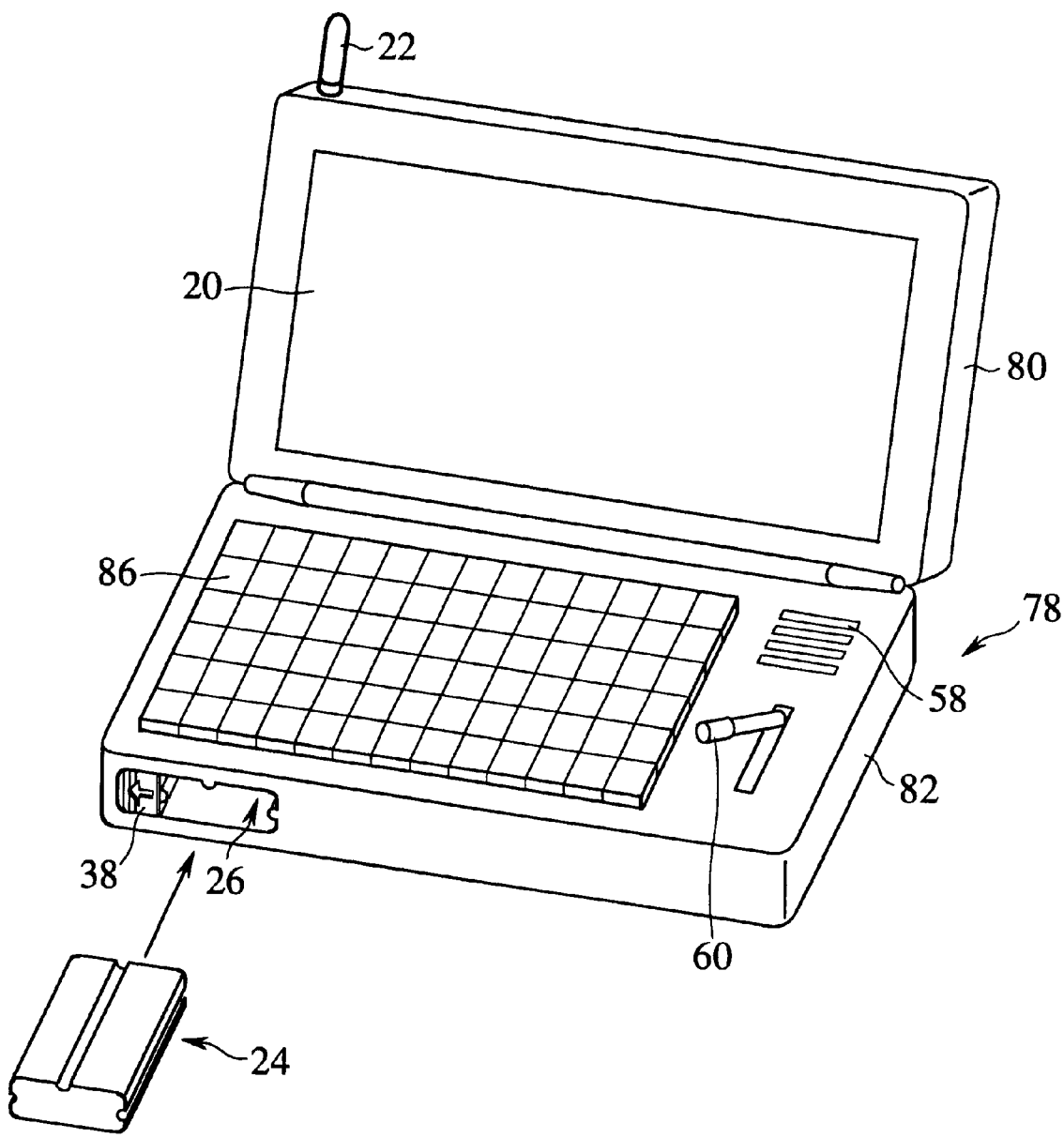
FIG. 4 is a perspective view of the telephone transmitting/receiving unit and the mobile communication terminal according to a second embodiment of the present invention.

The telephone transmitting/receiving unit and the mobile communication terminal according to a second embodiment of the present invention will be explained with reference to FIG. 4. FIG. 4 is a perspective view of the telephone transmitting/receiving unit and the mobile communication terminal according to the present embodiment. The same members of the telephone transmitting/receiving unit and the mobile communication terminal according to the present embodiment as those according to the first embodiment are represented by the same reference numbers not to repeat or to simplify their explanation.

The telephone transmitting/receiving unit according to the present embodiment is the same as that according to the first embodiment. The present embodiment is different from the first embodiment in that in the present embodiment the mobile communication terminal is a mobile computer.

The mobile computer 78 includes, as shown in FIG. 3 inside the dot line, a transmitting/receiving antenna 22, a receiving antenna (not shown), a speaker 58, a microphone 60, a liquid crystal display unit 20, an operational unit 70 and a battery (not shown).

FIG. 4 shows the mobile computer 78 with a lid unit 80 opened. A body 82 includes a plurality of keys 86 as an operational unit 70. A microphone 60 and a speaker 58 are disposed on the right side of the plural keys 86. The microphone 60 is tilted at a required angle to input speech uttered by a user. A slot 26 is formed in the front side of the body 82, which receives the telephone transmitting/receiving unit 24. A slide button 38 is formed in the slot 26 for securing the telephone transmitting/receiving unit 24.

On the other hand, on the lid 80 there are formed a liquid crystal display unit 20, a transmitting/receiving antenna 22 and a receiving antenna (not shown). When a communication is performed, a screen for inputting a telephone number, an electronic mail address, etc., a screen for displaying an operational state, etc. are displayed on the liquid crystal display unit 20.

As described above, according to the present embodiment, the slot is formed in the mobile computer, and when a mobile communication is performed by the use of the mobile computer, the telephone transmitting/receiving unit is loaded in the slot in the mobile computer, whereby comfortable mobile communication corresponding to a time, place and occasion can be provided without contracting a plurality of circuits.

A Third Embodiment

Figure 5:
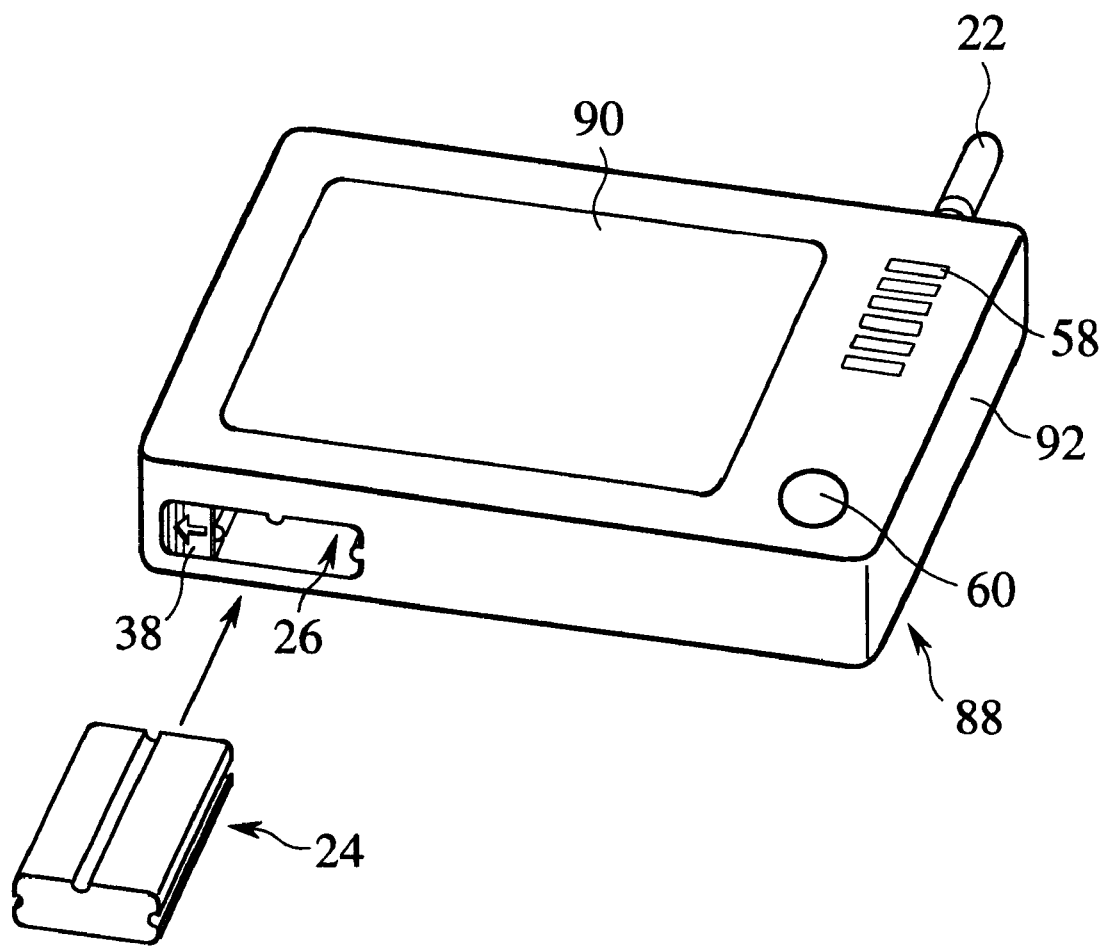
FIG. 5 is a perspective view of the telephone transmitting/receiving unit and the mobile communication terminal according to a third embodiment of the present invention.

The telephone transmitting/receiving unit and the mobile communication terminal according to a third embodiment of the present invention will be explained with reference to FIG. 5. FIG. 5 is a perspective of the telephone transmitting/receiving unit and the mobile communication terminal according to the present embodiment. The same members of the telephone transmitting/receiving unit and the mobile communication terminal according to the present embodiment as those according to the first or the second embodiment shown in FIGS. 1 to 4 are represented by the same reference numbers not to repeat or to simplify their explanation.

The telephone transmitting/receiving unit according to the present embodiment is the same as that according to the first or the second embodiment. The present embodiment is different from the first or the second embodiment in that in the present embodiment includes the mobile communication terminal is a PDA.

The PDA 88 includes a transmitting/receiving antenna 22, a receiving antenna (not shown), a speaker 58, a microphone 60 and a battery (not shown) as shown in FIG. 3, but the present embodiment includes a touch panel which combines the liquid crystal display unit 20 and the operational unit 70.

The touch panel 90 is formed in a body 92 of the PDA 88, and the microphone 60 and the speaker 58 are disposed on the right side of the touch panel 90. A slot 26 is formed in the front side of the body 92 for receiving the telephone transmitting/receiving unit 24. A slide button 38 is disposed in the slot 26 for securing the telephone transmitting/receiving unit 24.

When a communication is performed, screens for inputting a telephone number, an electronic mail address, etc. are displayed on the touch panel 90. A user touches the touch panel 90 to input a telephone number, an electronic mail address, etc. A screens, etc. for displaying an operational state are also displayed on the touch panel 90.

As described above, according to the present embodiment, the slot is formed in the PDA, and when a mobile communication is performed by the use of the PDA, the telephone transmitting/receiving unit is loaded in the slot of the PDA, whereby the mobile communication can be performed. This permits comfortable mobile communication to be performed corresponding to a time, place and occasion without contracting a plurality of circuits.

A Fourth Embodiment

Figure 6:
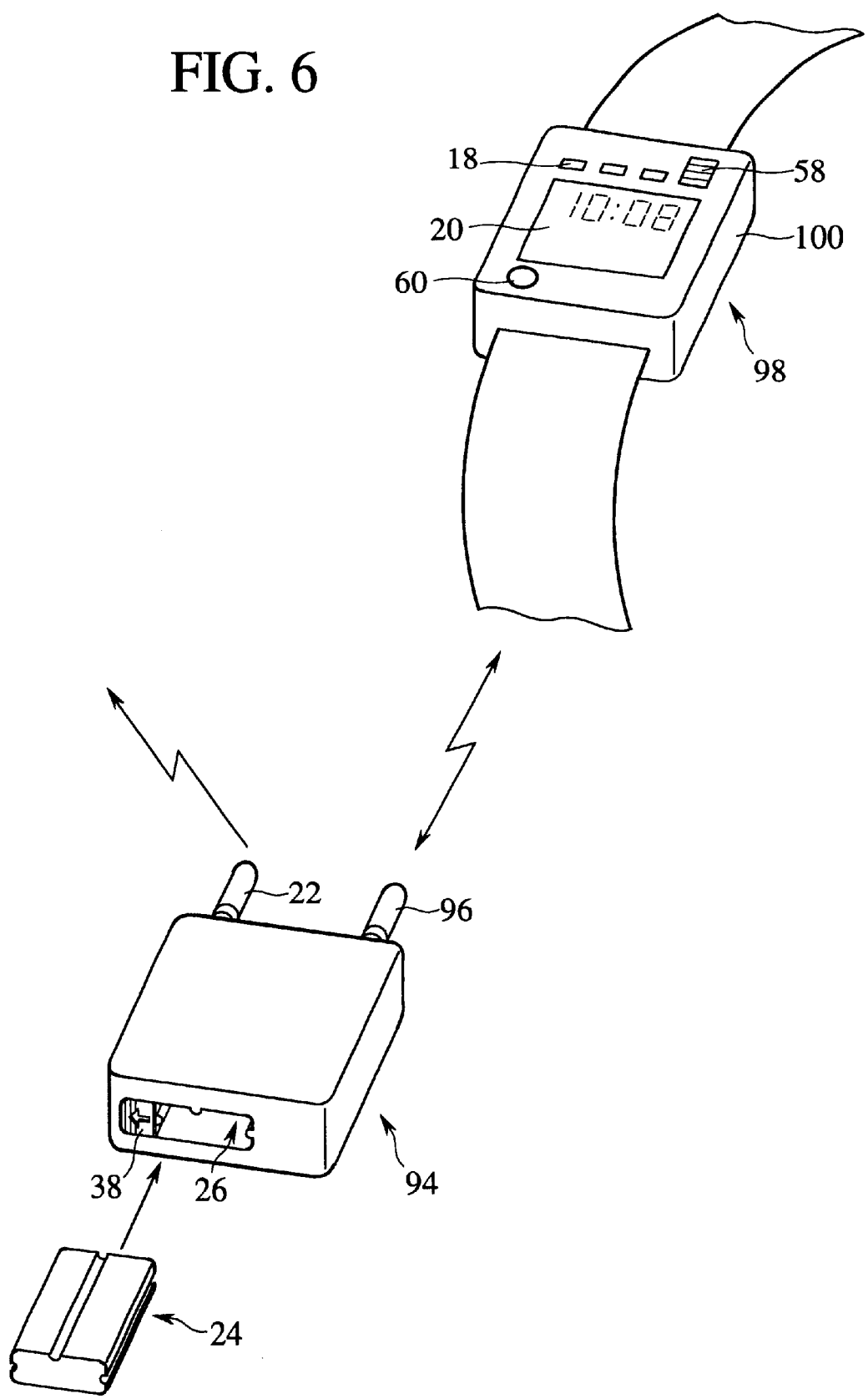
FIG. 6 is a perspective view of the telephone transmitting/receiving unit, the mobile communication relay terminal and the mobile communication terminal according to a fourth embodiment of the present invention.

The telephone transmitting/receiving unit, mobile communication relay terminal and the mobile communication terminal according to a fourth embodiment of the present invention will be explained with reference to FIG. 6. FIG. 6 is a perspective view of the telephone transmitting/receiving unit, the mobile communication relay terminal and the mobile communication terminal according to the present embodiment. The same members of the telephone transmitting/receiving unit and the mobile communication terminal according to the present embodiment as those according to the first to the third embodiments shown in FIGS. 1 to 5 are represented by the same reference numbers not to repeat or to simplify their explanation.

The present embodiment is characterized in that a part of the constituent members included in the mobile communication terminal in the first to the third embodiments are included in the mobile communication relay terminal, whereby the mobile communication terminal is smaller-sized, and signals are relayed by the mobile communication relay terminal to perform mobile communication. The telephone transmitting/receiving unit according to the present embodiment is the same as the telephone transmitting/receiving unit according to the first to the third embodiment.

The mobile communication relay terminal 94 includes a slot 26, a transmitting/receiving antenna 22, a receiving antenna (not shown), a battery (not shown), an electronic circuit (not shown) for performing prescribed signal processing and a transmitting/receiving antenna 96 for transmitting/receiving signals to/from the mobile communication terminal. The mobile communication terminal 94 is small-sized sufficiently to be carried in a bag or the like. The slot 26 has the same constitution as the slots 26 of the first to the third embodiments. A slide button 38 is disposed in the slot 26 for securing the telephone transmitting/receiving unit 24.

As shown in FIG. 6, the mobile communication terminal according to the present embodiment is a wrist watch 98. In a body 100 of the wrist watch 98 there are provided a transmitting/receiving antenna (not shown) for transmitting/receiving signals to/from the mobile communication relay terminal 94 and an electronic circuit (not shown) for performing prescribed processing. Operational buttons 18, a liquid crystal display unit 20, a speaker 58 and a microphone 60 are formed on the upper surface of the body 100. When a mobile communication is performed, screens for inputting a telephone number, an electronic mail address, etc. are displayed on the liquid crystal display unit 20. A user performs prescribed operations by pressing the operational buttons 18 to input a telephone number, an electronic mail address, etc. Screens, etc. for displaying a date and time, an operational state, etc. are displayed on the liquid crystal display unit 20.

The liquid crystal display unit 20 may be replaced by a touch panel, so that a telephone number, an electronic mail address, etc. are inputted by a touch pen.

As described above, according to the present embodiment, the slot is formed in the mobile communication relay terminal, whereby when a mobile communication is performed by the use of the wrist watch, which is a small-sized mobile communication terminal, transmitted/received signals are relayed by the mobile communication relay terminal to performed the mobile communication. This permits comfortable mobile communication to be performed by the use of a smaller-sized mobile communication terminal in the form of a wrist watch or the like corresponding to a time, place and occasion.

A Fifth Embodiment

The telephone transmitting/receiving unit, the mobile communication relay terminal and the mobile communication terminal according to a fifth embodiment of the present invention will be explained with reference to FIG. 7. FIG. 7 is a perspective view of the telephone transmitting/receiving unit, the mobile communication relay terminal and the mobile communication terminal according to the present embodiment. The same members of the telephone transmitting/receiving unit, the mobile communication relay terminal and the mobile communication terminal according to the present embodiment as those according to the first to the fourth embodiments shown in FIGS. 1 to 6 are represented by the same reference numbers not to repeat or to simplify their explanation.

The telephone transmitting/receiving unit and the mobile communication relay terminal according to the present embodiment are the same as those according to the fourth embodiment. The present embodiment is different from the fourth embodiment in the mobile communication terminal.

As shown in FIG. 7, a body of the mobile communication terminal 104 of the mobile communication terminal 102 is formed mountably on an eyeglass frame 106. In the body 104 there are disposed an electronic circuit (not shown) for performing prescribed process, a transmitting/receiving antenna (not shown) for transmitting/receiving signals to/from the mobile communication relay terminal 94 and a battery (not shown) for supplying electric power to the electronic circuit. A minimum number of operational buttons 18 are formed on the side surface of the body 104. A microphone 60 is formed on the body 104. The microphone 60 has a rod-shaped frame 108 for locating the microphone near the mouth of a user. The speaker 58 disposed in an earphone 112 is connected to the electronic circuit formed in the body 104 through a wiring cable. A user performs the mobile communication by putting the earphone on an ear and inputting speech through the microphone 60.

As described above, according to the present embodiment, the mobile communication terminal is mountable on an eyeglass frame, whereby comfortable mobile communication can be provided corresponding to a time, place and occasion.

A Sixth Embodiment

Figure 8:
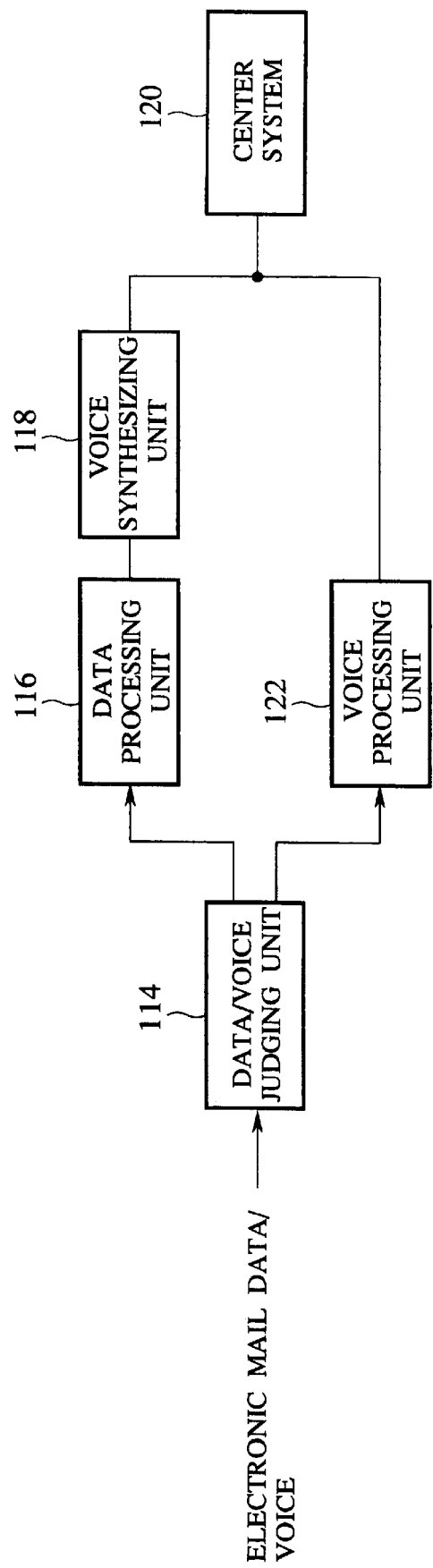
FIG. 8 is a block diagram of the communication service system according to a sixth embodiment of the present invention.

A communication service system according to a sixth embodiment of the present invention will be explained with reference to FIG. 8. FIG. 8 is a block diagram of the communication service system according to the present embodiment.

The present embodiment is characterized by the communication service that the telephone transmitting/receiving unit, the mobile communication relay terminal, the mobile communication terminal, etc. according to the first to the fifth embodiments of the present invention are used to convert electronic mail data to voices to thereby transmit the communication.

As shown in FIG. 8, electronic mail data or a voice signal transmitted by a transmitter to a communication service company through a communication network is judged by a data/voice judging unit 114 as to whether or not it is electronic mail data or a voice signal, and when it is electronic mail data, the data is inputted to a data processing unit 116. The data processing unit 116 performs prescribed data processing on the inputted electronic mail data and outputs the data to a voice synthesizing unit 118. The voice synthesizing unit 118 converts the inputted data to voice signals and outputs the voice signals to center system 120. The center system 120 stores the inputted voice signals in memory unit (not shown).

The voice signal which has been judged to be a voice by the data/voice judging unit 114 is inputted to a voice processing unit 122. The voice processing unit 122 performs prescribed processing the inputted voice signal and outputs the voice signal to the center system 120. The center system 120 stores the inputted voice signal in the memory unit.

When a user wants to know contents of the electronic mail, he(she) accesses the center system 120 by the mobile communication terminal, and then the center system 120 transmits the voice signal stored in the memory unit to the mobile communication terminal or others of the user.

As described above, according to the present embodiment, even by the use of a mobile communication terminal or others having no function of displaying data of an electronic data in letters, contents of the electronic mail addressed to a user can be known.

Modifications

The present invention is not limited to the above-described embodiments and can cover other various modifications.

For example, in the first to the fifth embodiments, the electronic circuit provided in the cartridge is not limited to the above-described structure, and the constituent members of the CODEC, the control unit, etc., for example, may be provided in the mobile communication terminal or the mobile communication relay terminal. A part of the constituent members may be integrated or omitted, or other constituent members may be added.

The first to the fifth embodiments use digital communication of PDC method, but are not limited to the digital communication of PDC method. Other digital communication methods may be used, and analog communication or others may be used.

The first embodiment uses PHS terminal, but may use the usual portable telephone, car telephone, etc.

In the first to the fifth embodiments transmission and receiving of signals can be performed not only between PHS base stations, but also between all base stations, such as NTT (Nippon Telegraph and Telephone company) base stations, base stations of private circuits.

In the first to the fifth embodiments, the cartridge has substantially rectangular sectional shape but may have circular or elliptical sectional shape. By further integrating the electronic circuit the cartridge can be formed in the shape of a card, chip or the like.

In the first to the fifth embodiments the mobile communication terminal may be, e.g., note-type computers, electronic notebooks, portable DVD (Digital Versatile Disk) decks, etc. The mobile communication terminal may be mounted or incorporated in any object, such as a fountain pen, glove, key holder, lighter, uniform, pendant, etc.

In the fist to the third embodiments, not only telephone calls, electronic mail communication, etc. are made, but also television telephone, etc. using the liquid crystal display, the touch panel, etc. may be realized.

In the fourth and the fifth embodiments the mobile communication relay terminal may further include a liquid crystal display, an operational unit, etc.

In the first to the fifth embodiments, the input/output terminals are used for inputting/outputting signals between the telephone transmitting/receiving unit and the mobile communication terminal, and between the telephone transmitting/receiving unit and the mobile communication relay terminal, but other methods, such as infrared communication, etc., may be used.

In the sixth embodiment, voice signals inputted from the voice synthesizing unit to the center system, and voice signals inputted from the voice processing unit to the center system may not be stored in the memory unit, but may be transmitted directly to a receiver.

In the sixth embodiment, a communication terminal used by a user is not limited to the mobile communication terminal, and the center system may be accessed by a usual telephone or others.

What is claimed is:

1. A telephone transmitting/receiving unit, comprising:
   an electronic circuit adapted to convert a signal received by an antenna to a voice signal to be outputted by a speaker, said electronic circuit being adapted to convert a voice signal inputted to a microphone to a transmitted signal to be outputted by the antenna, said electronic circuit being adapted to conduct prescribed processing based on an operational signal from an operational unit, said electronic circuit also being adapted to generate a display signal to be displayed in a display unit and said electronic circuit providing a single contracted circuit for a telephone system, wherein the single contracted circuit is associated with a unique identifier such that the identity of the telephone transmitting/receiving unit is known within the telephone system;
   a cartridge which includes the electronic circuit, wherein the cartridge is adapted to be removably loaded in a slot formed in a mobile communication terminal such that the electronic circuit is coupled to the mobile communication terminal, and wherein the cartridge must be loaded in the slot in order for the mobile communication terminal to perform a transmitting and receiving function using the contracted circuit, wherein said cartridge is formed so that said slot could receive the overall length of the cartridge to conceal the cartridge of the telephone transmitting/receiving unit from the outside; and
   an input/output unit included in the cartridge, said input/output unit being adapted to input/output a signal to/from said mobile communication terminal.

2. A mobile communication terminal comprising:
   an antenna for transmitting/receiving a signal to/from a base station;
   a speaker for outputting a voice signal;
   a microphone for inputting a voice signal;
   an operational unit for generating an operational signal, based on an operation;
   a display unit for display based on a display signal;
   a slot for receiving the overall length of the cartridge of the telephone transmitting/receiving unit according to claim 1 to conceal the cartridge of the telephone transmitting/receiving unit from the outside; and
   an input/output unit included in said slot for inputting/outputting a signal to/from the telephone transmitting/receiving unit, wherein
   said mobile communication terminal performs a transmitting and receiving function using the contracted circuit when the telephone transmitting/receiving unit is loaded in the slot.

3. A mobile communication relay terminal comprising:
   an antenna for transmitting/receiving a signal to/from a base station;
   a slot for receiving the telephone transmitting/receiving unit according to claim 1, wherein said telephone transmitting/receiving unit must be inserted in the slot in order for the mobile communication relay terminal to perform a transmitting and receiving function;
   an input/output unit disposed in said slot for inputting/outputting a signal to/from the telephone transmitting/receiving unit; and
   a unit for transmitting/receiving a signal to/from a mobile communication terminal.

4. A mobile communication terminal comprising:
   a microphone for inputting a voice signal;
   a speaker for outputting a voice signal; and
   a unit for transmitting/receiving a signal to/from said mobile communication relay terminal according to claim 3.

5. A mobile communication terminal according to claim 2, wherein the mobile communication terminal is in the form of one of a portable telephone, a personal handy phone, a personal digital assistant and a mobile computer.

6. A mobile communication terminal according to claim 4, wherein the mobile communication terminal is in the form of one of a fountain pen, a key holder, a lighter and a pendant.

7. A communication system comprising:
   a receiving unit for receiving transmitted electronic mail data;
   a processing unit for converting the received electronic mail data to a voice signal;
   a memory unit for temporarily storing the voice signal, said voice signal being transmitted from said memory unit to a mobile communication terminal in response to a command from the mobile communication terminal; and
   a transmitter for transmitting the voice signal to said mobile communication terminal,
   said mobile communication terminal comprising:
      an antenna for transmitting/receiving a signal to/from a base station;
      a speaker for outputting a voice signal;
      a microphone for inputting a voice signal;
      an operational unit for generating an operational signal, based on an operation;
      a display unit for display based on a display signal;
      a slot for receiving an overall length of a cartridge of a telephone transmitting/receiving unit to conceal the cartridge of the telephone transmitting/receiving unit from the outside; and
      an input/output unit included in said slot for inputting/outputting a signal to/from the telephone transmitting/receiving unit, wherein said mobile communication terminal performs a transmitting and receiving function using a single contracted circuit for a telephone system when the telephone transmitting/receiving unit is loaded in the slot, wherein the single contracted circuit is associated with a unique identifier such that the identity of the telephone transmitting/receiving unit is known within the telephone system.

8. A method for processing communicated data, comprising:

transmitting electronic mail data;

receiving said electronic mail data at a receiving unit;

converting said received electronic mail data to a voice signal; and transmitting the voice signal to a mobile communication terminal, said mobile communication terminal comprising:

an antenna for transmitting/receiving a signal to/from a base station;

a speaker for outputting a voice signal;

a microphone for inputting a voice signal;

an operational unit for generating an operational signal, based on an operation;

a display unit for display based on a display signal;

a slot for receiving an overall length of a cartridge of a telephone transmitting/receiving unit to conceal the cartridge of the telephone transmitting/receiving unit from the outside; and an input/output unit included in said slot for inputting/outputting a signal to/from the telephone transmitting/receiving unit, wherein said mobile communication terminal performs a transmitting and receiving function using a single contracted circuit for a telephone system when the telephone transmitting/receiving unit is loaded in the slot, wherein the single contracted circuit is associated with a unique identifier such that the identity of the telephone transmitting/receiving unit is known within the telephone system.

9. The method as in claim 8 further comprising:

temporarily storing the voice signal; and receiving a command from the mobile communication terminal and in response thereto transmitting the stored voice signal to the mobile communication terminal.

* * * * *